May 12, 1959  C. W. SKELTON ET AL  2,886,661
ELECTRICAL SWITCHING MECHANISM FOR INTERVALOMETER
Filed May 10, 1956  6 Sheets-Sheet 1

INVENTORS
Charles W. Skelton,
Jack S. Mason
and Frank E. Whisenant
BY
Stevens, Davis, Miller & Mosher
ATTORNEYS May 12, 1959  C. W. SKELTON ET AL  2,886,661
ELECTRICAL SWITCHING MECHANISM FOR INTERVALOMETER
Filed May 10, 1956  6 Sheets-Sheet 2

INVENTORS
Charles W. Skelton
Jack S. Mason
and Frank E. Whisenant
BY Stevens, Davis, Miller & Mosher
ATTORNEYS May 12, 1959   C. W. SKELTON ET AL   2,886,661
ELECTRICAL SWITCHING MECHANISM FOR INTERVALOMETER
Filed May 10, 1956                    6 Sheets-Sheet 3

INVENTORS
Charles W. Skelton,
Jack S. Mason
and Frank E. Whisenant
BY Stevens, Davis, Miller & Mosher
ATTORNEYS May 12, 1959 C. W. SKELTON ET AL 2,886,661
ELECTRICAL SWITCHING MECHANISM FOR INTERVALOMETER
Filed May 10, 1956 6 Sheets-Sheet 4

INVENTORS
Charles W. Skelton
Jack S. Mason
and Frank E. Whisenant
BY
Stevens, Davis, Miller & Mosher
ATTORNEYS May 12, 1959  C. W. SKELTON ET AL  2,886,661
ELECTRICAL SWITCHING MECHANISM FOR INTERVALOMETER
Filed May 10, 1956  6 Sheets-Sheet 5

INVENTORS
Charles W. Skelton
Jack S. Mason
and Frank E. Whisenant
BY
Stevens, Davis, Miller & Mosher
ATTORNEYS May 12, 1959 C. W. SKELTON ET AL 2,886,661
ELECTRICAL SWITCHING MECHANISM FOR INTERVALOMETER
Filed May 10, 1956 6 Sheets-Sheet 6
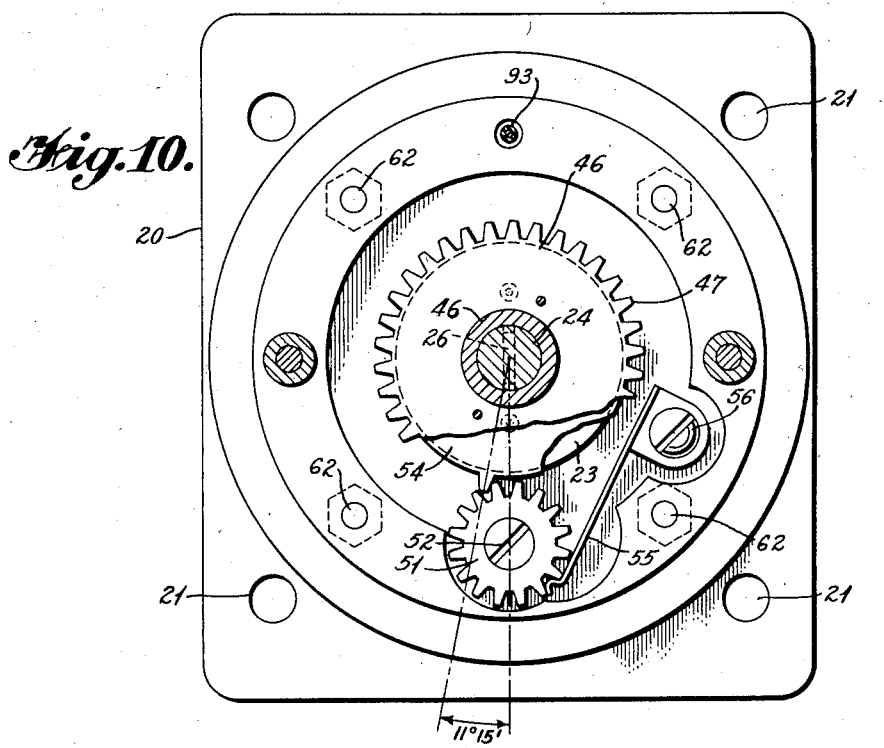
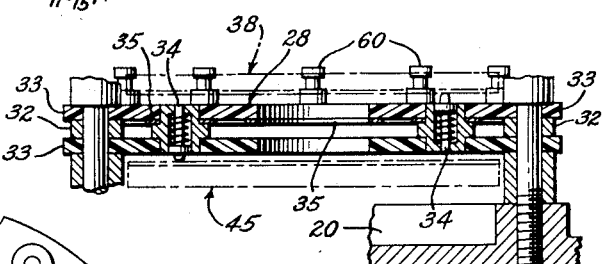
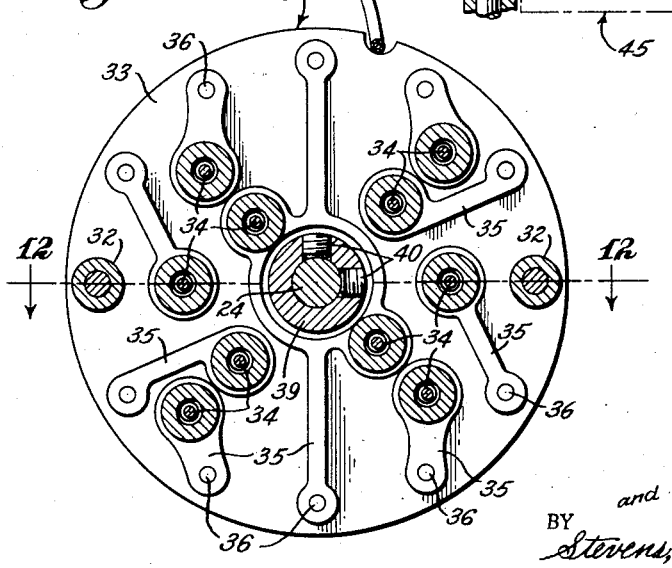
INVENTORS
Charles W. Skelton
Jack S. Mason
and Frank E. Whisenant
BY Stevens, Davis, Miller & Mosher
ATTORNEYS

United States Patent Office 2,886,661
Patented May 12, 1959

2,886,661

ELECTRICAL SWITCHING MECHANISM FOR INTERVALOMETER

Charles W. Skelton, Irving, and Jack S. Mason and Frank E. Whisenant, Dallas, Tex., assignors to Texas Instruments Incorporated, Dallas, Tex., a corporation of Delaware Application May 10, 1956, Serial No. 584,126

6 Claims. (Cl. 200—5)

This invention relates to an electrical switching device that is particularly useful in making the electrical connections for an electronic intervalometer. This electrical switching mechanism is relatively simple, rugged, positive, and furnishes an unusually large number of switching positions. Thus, the switching mechanism is obviously useful for other purposes, either in the exact form in which is has been constructed for use with an electronic intervalometer or in somewhat modified form.

The electrical switching mechanism of this invention is of the rotary, multi-position type, and there are so many switches of this general type that it would be fruitless to attempt to discuss the prior art in detail.

The purpose for which the electrical switch of this invention was devised was that of controlling an electronic intervalometer. An electronic intervalometer is an electrical circuit that is adapted to be triggered by an electrical pulse and then to yield an electrical pulse a definite length of time thereafter. This length of time may be varied by changing the electrical connections of the intervalometer, and in the case of the intervalometer for which this switch was invented, the time period may be varied by switching, by the use of the switch of this invention, from 0 to 63.75 seconds in steps of .25 second. This means that a total of two hundred and fifty-six switch positions must be provided, and in order for the intervalometer to work accurately and surely, the switch positions must be adequately separated so that there can be no overlapping, the connections must be positive, the device must be rugged, and positive indexing mechanism must be provided so that the operator may at any time know with certainty the position in which the switch is set.

All these things are provided in the switching mechanism of this invention, and it will at once be apparent that these desirable features will make switches incorporating the principles of this invention useful in many other applications.

In a general way, the switch mechanism of this invention consists of an indexing head and an electrical contact-making mechanism mounted together so that the indexing head drives the contact-making mechanism and provides a positive indication of its position. The indexing head consists of a rotatable switch knob that turns step by step through a plurality of revolutions to move the contact-making mechanism through one full cycle. A detent arrangement is provided to spot the indexing mechanism at various predetermined rotative positions corresponding to various contact mechanism settings.

A position indicator for the switch knob is provided in the indexing mechanism. This consists of a pair of superimposed disks, one of which is attached directly to the switch knob and the other of which is connected to the switch knob through intermittent reduction gearing. As a result, the disk connected to the switch knob rotates with the switch knob and indicates the position of the switch knob throughout one revolution thereof, or a portion of one revolution, and the other disk rotates more slowly as compared with the switch knob and indicates the position of the switch knob throughout the whole cycle of switch operation, which comprises several complete revolutions of the knob. Thus, in effect, the disk connected directly to the switch knob acts as a vernier indicator and the other disk operates as the over-all indicator. The indications of both disks are digital.

The contact mechanism consists of a fixed plate or disk carrying a plurality of spring-pressed contact brushes extending out of each side of it. This brush plate is arranged to extend radially of the main drive shaft of the switch mechanism but is not connected to it. Two flat, contact-carrying disks are arranged, one on either side of the brush plate, so that the brushes of the plate will press against flat contacts carried by these disks. One of the contact-carrying disks is arranged to rotate step by step with the main shaft of the switch mechanism and the switch knob of the indexing mechanism. The other is operated through intermittent gearing to turn, also step by step but only intermittently, and thus rotate only once for a plurality of rotations of the other disk. The contacts on these disks are so arranged that in combination they provide two hundred and fifty-six switching combinations in the preferred embodiment.

Further details and advantages of the switching mechanism of this invention will be apparent from the appended drawings and from the following detailed description thereof. These drawings show the preferred embodiment of this switching mechanism as used for the control of an electronic intervalometer, but it will be readily understood that the switching mechanism of this invention may be used in the same form for many other purposes and may be modified in numerous ways that will at once be apparent to those skilled in the art.

In the drawings:

Figure 10 is a similar view taken on lines 10—10 of Figure 3, certain parts being cut away;

Figure 11 is a similar view taken on lines 11—11 of Figure 3;

Figure 2:
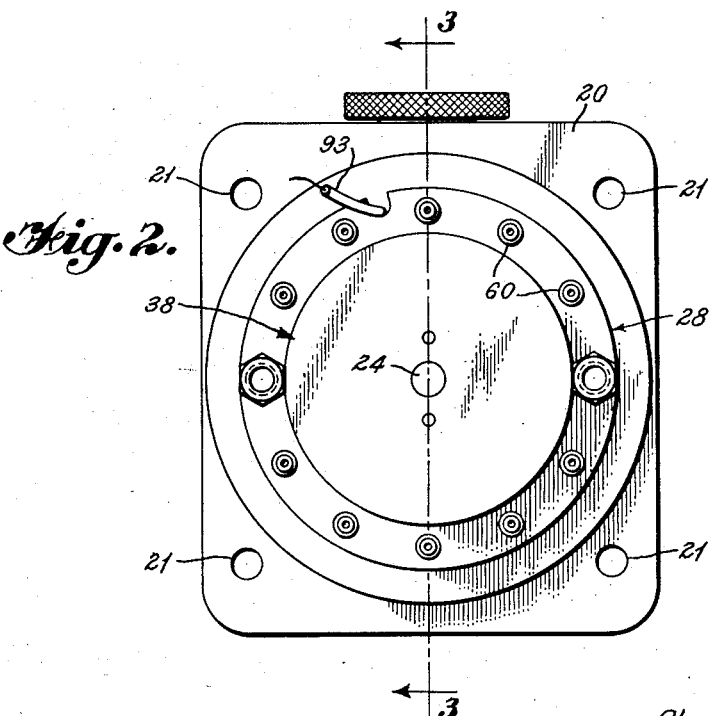
Figure 2 is a rear view of the same mechanism.
Figures 13, 14:
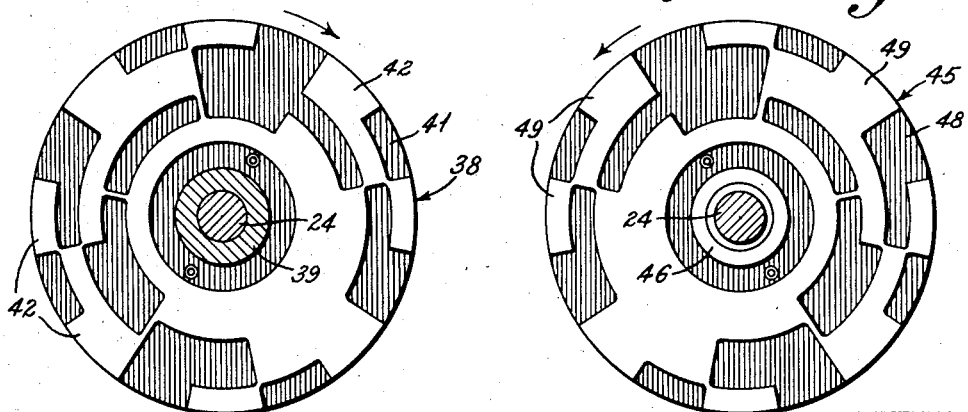

Figure 12 is a fragmentary view taken on lines 12—12 of Figure 11 to show a particular detail; and Figures 13 and 14 are sectional views taken on lines 13—13 and 14—14 of Figure 2, and showing only the flat, contact-carrying disks.

Figure 1:
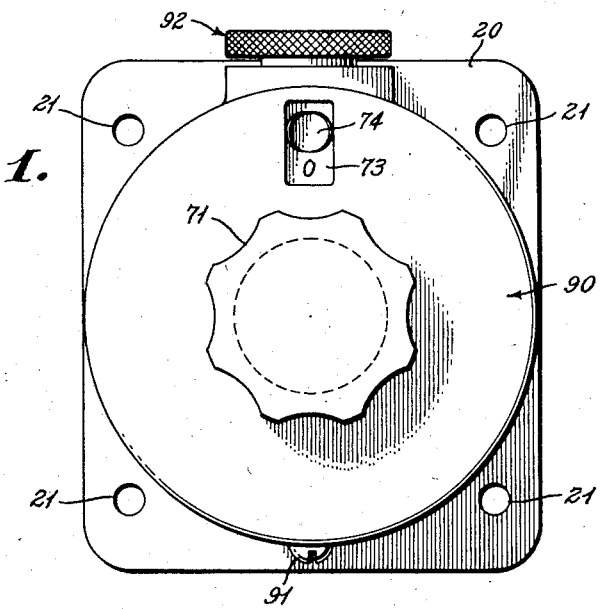
Figure 1 is a front view of the switching mechanism of this invention.
Figure 3:
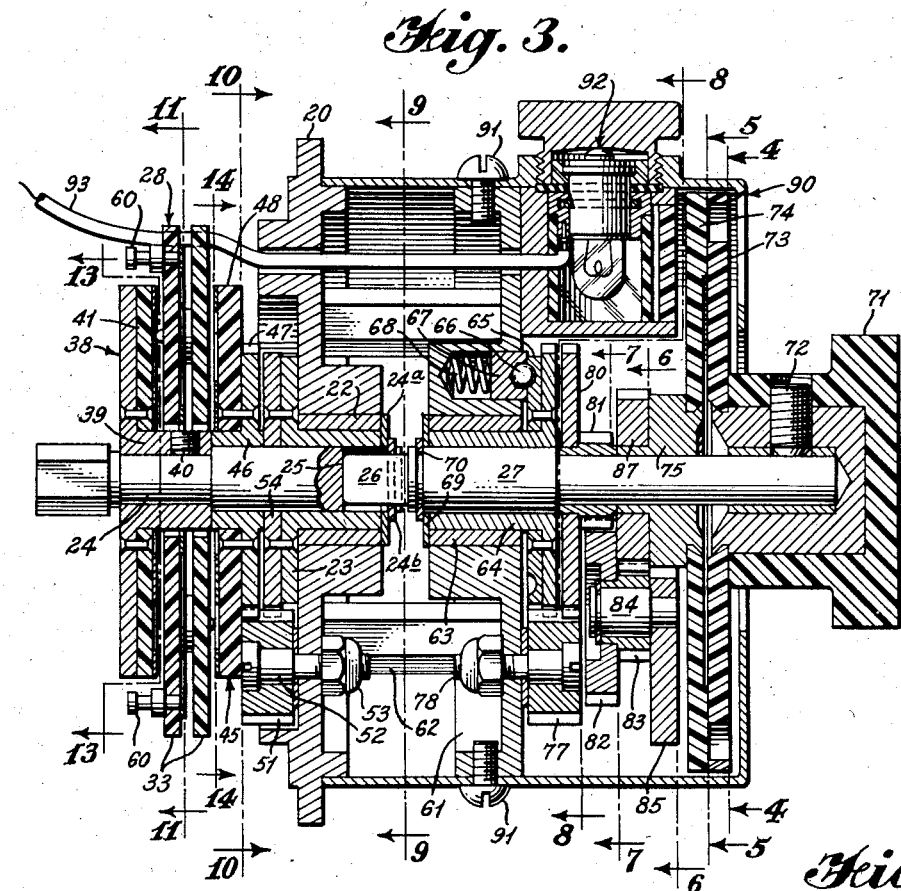
Figure 3 is a sectional view of the same mechanism, on an enlarged scale, and taken on lines 3—3 of Figure 2.

Referring first to Figures 1, 2 and 3, it will be seen that the device of this invention is constructed upon a base member 20 that is adapted to be mounted on an instrument panel or a box which will shield or protect the switching mechanism and the electrical circuit connected thereto. (The panel and electrical circuit are not shown.) As can be seen in Figures 1 and 2, a series of screw holes 21 are provided in the base 20 for the purpose of attaching it to the panel or box.

The contact-making mechanism is mounted directly on the base member 20 and will be first described. In the center of this base member, a fairly large opening is provided to receive a bushing 22, and in this bushing 22 a flanged sleeve 23 is mounted for rotation. The flange of the sleeve lies to the rear of the base member 20 (which is to the left as seen in Figure 3). Within the sleeve 23 is mounted the main shaft 24 of the contact-making mechanism, and the sleeve 23 is fixed to this main shaft so that they must rotate together. The sleeve 23 and the shaft 24 are held in the bushing 22 by washer 24a, that bears against the forward face of the bushing and the sleeve, and by a snap ring 24b, that fits into a groove in the shaft 24 and bears against the washer 24a. The forward end of the shaft 24 is slotted at 25 so that a flattened portion 26 of the indexing shaft 27 may extend into it and turn the contact-making mechanism shaft 24 when the indexing shaft 27 is turned.

Spaced rearwardly from the flanged sleeve 23 is a fixed brush plate 28, which extends radially outward from the main shaft 24, but is not connected to it. This brush plate 28 is supported by a pair of threaded shafts and nuts 29 extending rearwardly from the base member 20.

The brush plate 28 is comprised of two spaced, circular insulating plates 32 separated by a pair of washers 33, as seen in Figure 12, and carrying between them a plurality of spring-pressed contacting members or brushes 34, some of which are directed to extend from one side of the brush plate, and some of which are directed to extend from the other side. As can be seen in Figure 11, each of these brushes 34 is connected by a connector 35 to a terminal 36, which may, in turn, be connected to the circuit which the switch is to control. This circuit may either consist of a series of circuit components mounted on the back of the switch assembly itself or may consist of completely separate circuit elements, and hence has not been shown in the drawings.

Mounted directly on the main switch shaft 24 and facing the left-hand side of the brush plate 28, as seen in Figure 3, is a rear contact plate 38. This rear contact plate 38 consists of a flanged bushing 39 surrounding the main switch shaft 24 and clamped thereto by set screws 40, an insulating disk 41 riveted to the flange of the bushing 39 and certain flat conducting contact surfaces affixed to the surface of the insulating disk 41. The indexing mechanism is arranged so as to turn the main switch shaft 24 step by step, one-sixteenth of a turn (22°30′) at a time, and thus the rear contact plate 38 will also turn in sixteen steps. The conducting surfaces of the rear contact plate 38 are indicated as 42 in Figure 13. As can be seen in Figure 3, they are in a position to be contacted by certain of the brushes 34 of the brush plate 28.

On the other side of the brush plate 28 is mounted a similar contact plate 45. The front contact plate 45 consists of a flanged bushing 46, the flange of which carries gear teeth 47, as shown in Figure 10. This bushing is free to rotate upon the main shaft 24. The flange also carries a disk of insulating material 48, on which are mounted conductive sections 49, as shown in Figure 14.

The gear teeth 47 on the bushing 46 mesh with the teeth of another gear 51, as shown in Figures 3 and 10, and this gear is mounted for free rotation on the frame 20 by means of a specially shaped machine screw 52 and locking nut 53. Also meshing with the teeth of the gear 51 is a gear 54, which has only one tooth (Figure 10). This gear is mounted on the main switch shaft 24 and is riveted to the flanged bushing 23, already mentioned, which is fixed to the shaft 24 and rotates with it. The gear 51 is prevented from rotating, except when caused to do so by the gear 54, by a spring detent 55 fixed by a screw 56 to the frame 20.

As can be seen in Figure 10, the single tooth of the gear 54 contacts the gear 51, 11°15′ before it reaches the center line between the two gears. It then continues to rotate the gear 51 for a distance of 11°15′ after it passes the center line, and thus each time the single tooth of the gear 54 passes the gear 51, it rotates the gear 51 a sufficient distance so that gear 51, in turn, rotates gear 46 a distance of 22°30′, or one-sixteenth of one complete revolution.

In the preferred embodiment, which has been illustrated, the main drive shaft 24 is rotated by the indexing shaft 27 in steps of 22°30′, or one-sixteenth of a revolution. The rear contact plate 38 rotates with this shaft, one-sixteenth of a revolution for each step that the indexing shaft is rotated, but the forward contact plate 45 rotates one-sixteenth of the revolution only once for each complete revolution of the rear plate.

Thus it will be necessary to rotate the main shaft and the rear contact disk through sixteen complete revolutions in order to rotate the forward contact disk through one revolution, and the total combination of positions with the rear plate moving one-sixteenth of a turn at a time will be two hundred and fifty-six, that is, two hundred and fifty-six switch positions.

An examination of Figures 13 and 14 will show that in the outer ring of contacts on each contact plate, there are eight contacts and eight blank spaces. Thus, with each sixteenth of a revolution of rotation, contact is either made or broken. Progressing inwardly, the next ring of contacts consists of four contacts and four spaces, and thus contact, in this ring, is made or broken every second step of the rotation of the disk. Progressing inwardly to the next ring of contacts, we find two contacts and two spaces, and thus contact is made or broken only every fourth step of rotation of the disk. In the fourth ring of contacts progressing inwardly, there is only one area of contact and only one area of no contact (except for a pair of connecting strips across the no-contact area). In this ring of contacts, the contact will be made and broken only every half revolution. The final ring of contacts, which is the fifth ring counting inwardly from the outer circumference, is a complete conducting ring, and thus this ring makes contact at all times. The arrangement is such that a different combination of contacts results for each of the sixteen different rotative positions of each disk, and the combination of the two disks results in two hundred and fifty-six different combinations of contacts.

Reference to Figures 2 and 3 will show a series of binding posts 60 attached to the brush plate 28, and reference to Figure 11 will show the manner in which these binding posts 60 are connected through terminals 36 and connecting straps 35 to the various brushes 34.

Figure 7:
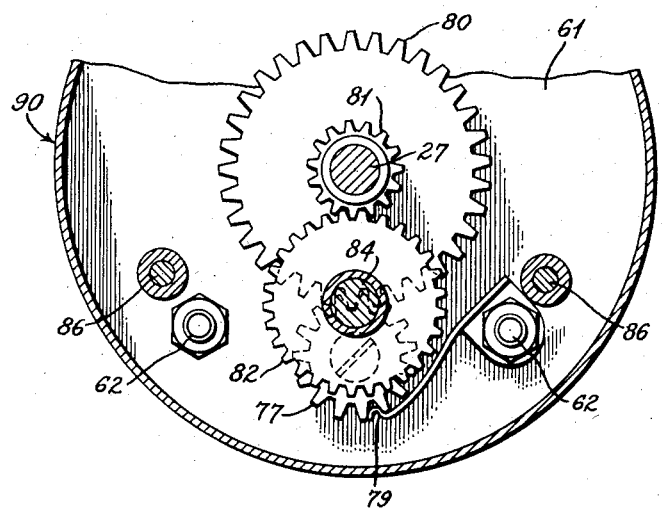
Figure 7 is a similar view taken on lines 7—7 of Figure 3.
Figure 8:
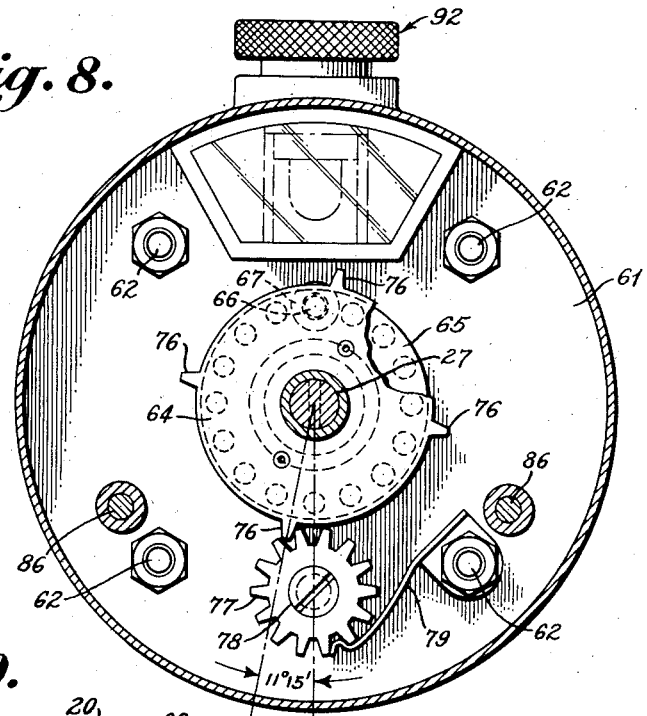
Figure 8 is a similar view taken on lines 8—8 of Figure 3.
Figure 9:
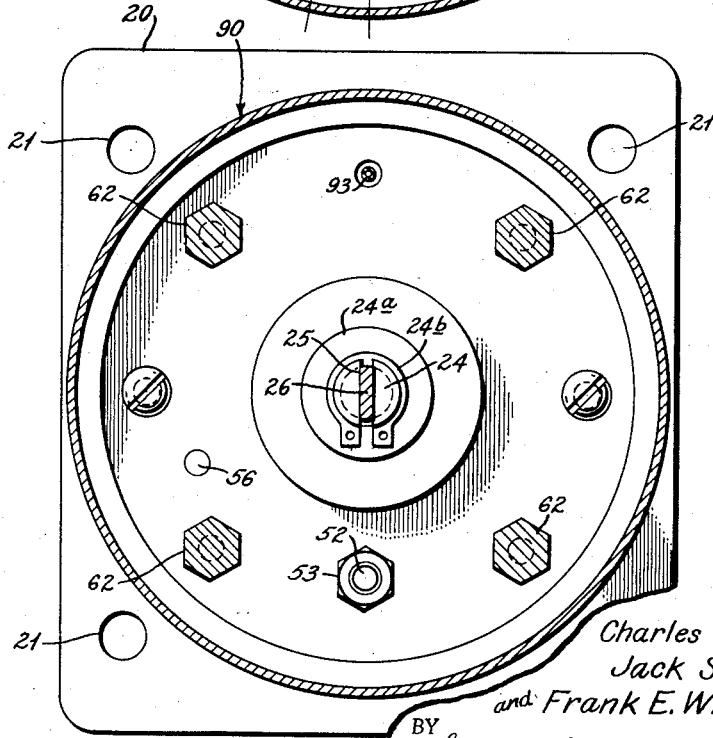
Figure 9 is a similar view taken on lines 9—9 of Figure 3.

Reference to Figure 3 will show that the contact-making mechanism, which has thus far been described, lies to the left of the dotted line 9—9 and that the indexing mechanism lies to the right of this line. The indexing mechanism is built upon a frame 61, somewhat similar to the frame 20 upon which the contact-making mechanism is built, and this frame 61 is mounted upon the frame 20 by a series of four spacer bolts 62, as can be seen in Figures 7, 8 and 9.

Like the contact mechanism frame 20, the indexing mechanism frame 61 is center-bored to receive a bushing 63, and this bushing receives a flanged sleeve 64, which in turn receives the indexing shaft 27. The indexing shaft 27 is fixed against rotation in the flanged sleeve 64, and this sleeve is rotatable in the bushing 63. The flange of the sleeve 64 lies at the forward end of the sleeve, or to the right as seen in Figure 3, and riveted to this flange is a detent plate 65. This detent plate 65 carries sixteen small depressions arranged in a circle near its periphery on its rear side. As can be seen in Figure 8, and as can be seen in Figure 3, these depressions cooperate with a ball 66 held in a slidable block 67 and pressed toward the plate by a spring 68. Both the slidable block 67 and the spring 68 are held in an appropriate recess in the frame 61. The result is a detent arrangement that positions the indexing mechanism definitely and positively in each of the sixteen predetermined rotative positions.

The flanged sleeve 64 and the indexing shaft 27 are held in position in the bushing 63 by means of a washer 69 abutting the rear ends of the sleeve 64 and the bushing 63 and a snap ring 70 abutting this washer and held in a groove in the indexing shaft 27. The rear end of the indexing shaft 27 is flattened at 26 to fit into a slot in the contact-making mechanism drive shaft 24.

At its forward end, the main indexing shaft 27 is provided with a suitable knob 71 so that it can be manually rotated. This knob is held in position on the main indexing shaft 27 by a set screw 72 and has an indexing disk 73 affixed to it. This indexing disk, therefore, turns one-sixteenth of a revolution each time the indexing knob is turned one notch of the detent mechanism.

While the indexing disk 73 would indicate the rotative position of the indexing mechanism throughout one rotation, this is not sufficient for the purposes of this invention since it is desired to indicate the rotative position of the indexing mechanism throughout a plurality of revolutions. Therefore, a second indexing disk 74 is provided immediately behind the first. This second indexing disk 74 is mounted on a hub 75, which is freely rotatable upon the main indexing shaft 27 so that it can be driven in the manner that will now be described.

The flanged sleeve 64 that surrounds the rear end of the indexing shaft 27 carriers four equally spaced gear teeth 76 upon the outer periphery of its flange, as can be seen in Figure 8. These teeth are positioned to coact with the teeth of another gear 77, as can be seen in Figures 3 and 8, and this gear 77 is mounted for free rotation on a bolt 78, which in turn is mounted in the frame 61.

As a result of this construction, the gear 77 is rotated a certain distance once every quarter revolution of the indexing shaft 27. This gear is prevented from rotating when not urged to do so by the gear teeth 76, by being restrained by a detent 79 which consists of a spring fastened under one of the bolt heads of one of the bolts 62.

Figure 6:
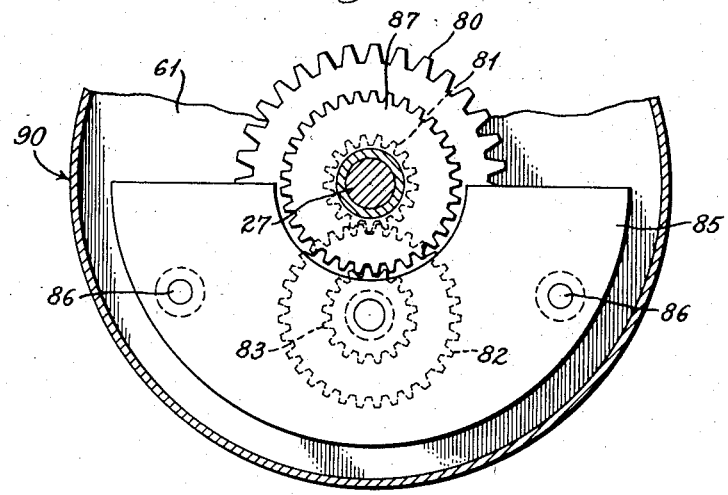
Figure 6 is a sectional view of the mechanism taken on lines 6—6 of Figure 3, with certain parts cut away.

When the gear 77 is rotated, it rotates a gear 80, which can be seen in Figures 3 and 7. The gear 80 is mounted for free rotation, along with a smaller gear 81, upon the indexing shaft 27. As can be seen, a portion of the gear 81 extends inside of the bore of the gear 80, and the two gears are attached so that they must rotate together. As a result of the rotation of the gear 80, the gear 81 also rotates, and the gear 81 contacts a gear 82, which can be seen in Figures 3 and 7, and rotates this gear along with a gear 83, which can be seen in Figures 3, 6 and 7. The gears 82 and 83 are coaxial and mounted on a pivot 84 attached to a supporting plate 85 which is supported by appropriate stud bolts 86 from the main frame. The gear 83 contacts a gear 87, which is mounted on and attached fixedly to the bushing 75, which supports the indexing disk 74.

The result of all of this gearing is to move the indexing disk 74 only once every quarter revolution of the indexing shaft 27 and the front indexing disk 73. When the rear indexing disk 74 is moved, it is moved a distance which depends upon the amount of gear reduction accomplished by the gear train just described, and this is such that each movement of the rear indexing disk 74 is equal to one-sixty-fourth of a complete revolution, or a little over five and one-half degrees. We are speaking now, of course, of the preferred embodiment.

Figure 5:
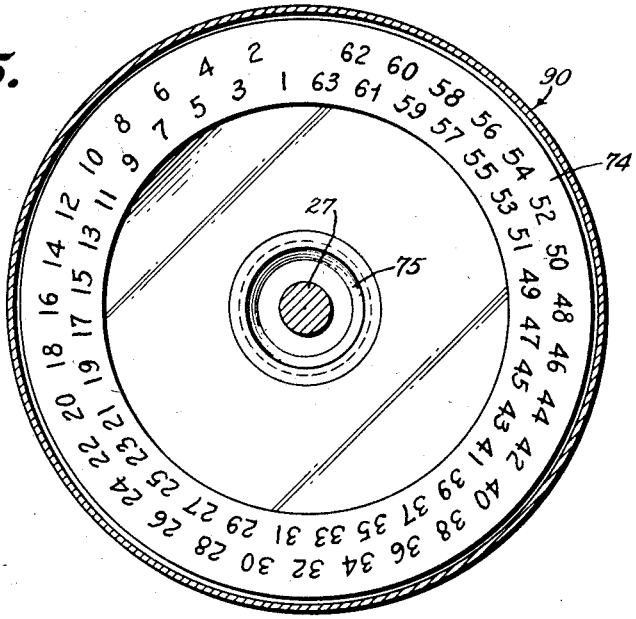
Figure 5 is a sectional view of the mechanism taken on lines 5—5 of Figure 3.

As can be seen in Figure 5, the rear indexing disk 74 is numbered with numbers running from 1 to 63, the 64th position being left blank. As can also be seen from Figure 5, the odd numbers of this series are positioned in an inner circle of numbers, and the even numbers are positioned in an outer circle of numbers. Thus as the disk of Figure 5 is moved up in steps of one-sixty-fourth of a revolution, one number after another will come to top dead center of the disk, but the even numbers will appear at that time in a higher position than the odd numbers.

Referring now to Figure 1, it will be seen that a cover 90 is provided to cover all of this indexing mechanism except that part of the two disks which are at top dead center, and as can be seen in Figure 3, this cover 90 is held in place by set screws 91. An indicator light 92 is appropriately provided and mounted just behind the indexing disks 73 and 74 at top dead center. This indexing light is supplied with electrical current by a wire 93 that passes through the device and out the rear end. The indexing disk 74 is of a translucent or transparent material so that light may pass through it to show the numbers upon it.

Figure 4:
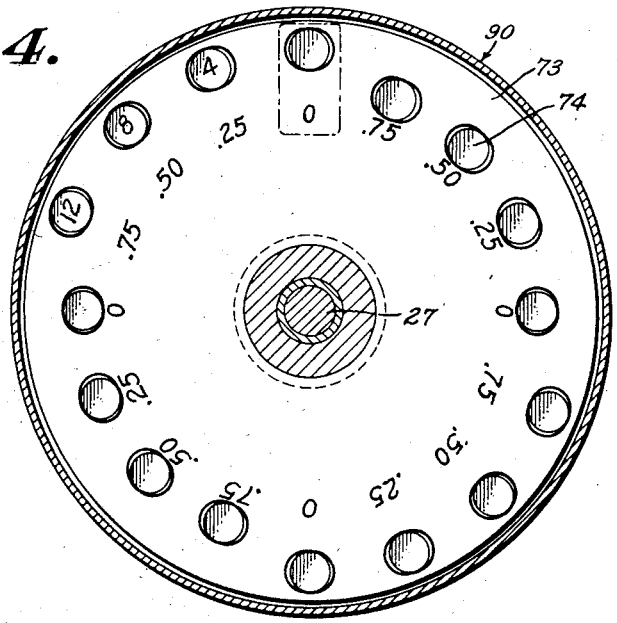
Figure 4 is a sectional view of the mechanism taken on lines 4—4 of Figure 3.

Referring now to Figure 4, it can be seen that the forward indexing disk 73 carries an inner circle of indicating figures. There are sixteen of these figures running in a counterclockwise direction—0, .25, .50, .75 and then repeating. Radially opposite each of these figures is a transverse opening extending through the indicator disk 73, and through one of these openings the appropriate figures on the rear disk 74 may be observed as the opening comes to top dead center, under the opening in the cover.

If the indexing disks are in the position shown in Figure 1, for example, one of the zeros of the front disk 73 will appear in the opening in the casing 90 and no numeral at all of the rear indicating disk 74 will appear through the opening in the outer case 90 and the registering opening in the front disk 73. This indicates that the switch is set for zero time. If the switch knob 71 is now rotated one notch in a clockwise direction, the indication .25 will appear through the cover opening on the front disk 73. Upon the next step in the clockwise rotation of the switch knob, the indication .25 will disappear and the indication .50 will appear. Still no numeral will appear from the rear indicating disk 74, but once the .75 indication has been passed and the indication 0 reached on the front disk, the numeral 1 on the rear disk will move up behind the registering opening in the front disk. Each time the switch knob is advanced a notch, the numeral 1 will appear through a different opening in the front disk, until it finally appears through the opening over the indication .75, and then on the next movement the numeral 2 will appear from the rear disk and 0 on the front disk. The opening through which the numeral 2 appears will, however, be somewhat nearer the edge of the disks 73 and 74.

As a result of this arrangement, the switch knob can be turned in steps of one-sixteenth of a turn per notch through sixteen complete revolutions and during this time the indications will advance from 0.0 to 0.25, 0.50, and so on, up to 63.75 and then back to 0.0. These indications will correspond to a total of two hundred and fifty-six different combinations of switch settings.

It will at once be apparent that the principles of this invention may be applied to the design of a switch having the characteristics of the one here described, but having a greater or a lesser number of contacts and, if desired, a different arrangement of contacts. Such modifications, and others which are well within the skill of those in this art, are considered to be within the scope of this invention and of the appended claims.

What is claimed is:

1. A rotary multi-position electrical switch that comprises an operating shaft mounted for rotation, a fixed brush plate radially disposed with respect to said shaft, a plurality of brushes extending from each face of said brush plate in a direction generally parallel to the axis of the operating shaft, the brushes on each face of the plate being diplaced from each other in a radial direction, a contact-carrying disk affixed to said operating shaft in a position such that its contacts will coact with the brushes on one side of the brush plate as the operating shaft is turned, a second contact-carrying disk rotatably mounted on said operating shaft in a position such that its contacts will coact with the brushes on the other side of the brush plate as this second contact-carrying disk is turned, and driving connections between the operating shaft and the said second disk for turning said second disk intermittently with respect to the rotation of the operating shaft.

2. A rotary multi-position electrical switch that comprises an operating shaft mounted for rotation, a fixed brush plate radially disposed with respect to said shaft, a plurality of brushes extending from each face of said brush plate in a direction generally parallel to the axis of the operating shaft, the brushes on each face of the plate being displaced from each other in a radial direction, a contact-carrying disk affixed to said operating shaft in a position such that its contacts will coact with the brushes on one side of the brush plate as the operating shaft is turned, a second contact-carrying disk rotatably mounted on said operating shaft in a position such that its contacts will coact with the brushes on the other side of the brush plate as this second contact-carrying disk is turned, electrical contacts arranged in concentric circles on each of said contact-carrying disks and at least one continuous circle contact on each disk, and driving connections between the operating shaft and the said second disk for turning said second disk intermittently with respect to the rotation of the operating shaft.

3. A rotary multi-position electrical switch that comprises an operating shaft mounted for rotation, a fixed brush plate radially disposed with respect to said shaft, a plurality of brushes extending from each face of said brush plate in a direction generally parallel to the axis of the operating shaft, the brushes on each face of the plate being displaced from each other in a radial direction, external electrical connections for said brushes, a contact-carrying disk affixed to said operating shaft in a position such that its contacts will coact with the brushes on one side of the brush plate as the operating shaft is turned, a second contact-carrying disk rotatably mounted on said operating shaft in a position such that its contacts will coact with the brushes on the other side of the brush plate as this second contact-carrying disk is turned, and driving connections between the operating shaft and the said second disk for turning said second disk intermittently with respect to the rotation of the operating shaft.

4. A rotary multi-position electrical switch that comprises an operating shaft mounted for step-by-step rotation, a fixed brush plate radially disposed with respect to said shaft, a plurality of brushes extending from each face of said brush plate in a direction generally parallel to the axis of the operating shaft, the brushes on each face of the plate being displaced from each other in a radial direction, a contact-carrying disk affixed to said operating shaft in a position such that its contacts will coact with the brushes on one side of the brush plate as the operating shaft is turned, a second contact-carrying disk rotatably mounted on said operating shaft in a position such that its contacts will coact with the brushes on the other side of the brush plate as this second contact-carrying disk is turned, driving connections between the operating shaft and the said second disk for turning said second disk intermittently with respect to the rotation of the operating shaft, detent mechanism for fixing the position of the steps of rotation of the operating shaft, an index dial affixed to the operating shaft for indicating its rotative position throughout at least a part of one rotation, a second index dial for indicating the rotative position of said operating shaft throughout a greater angle of rotation than the first, and means for driving said second dial intermittently from said operating shaft.

5. A rotary multi-position electrical switch that comprises an operating shaft mounted for step-by-step rotation, a fixed brush plate radially disposed with respect to said shaft, a plurality of brushes extending from each face of said brush plate in a direction generally parallel to the axis of the operating shaft, the brushes on each face of the plate being displaced from each other in a radial direction, a contact-carrying disk affixed to said operating shaft in a position such that its contacts will coact with the brushes on one side of the brush plate as the operating shaft is turned, a second contact-carrying disk rotatably mounted on said operating shaft in a position such that its contacts will coact with the brushes on the other side of the brush plate as said second contact-carrying disk is turned, driving connections between the operating shaft and the said second disk for turning said second disk intermittently with respect to the rotation of the operating shaft, an index dial affixed to the operating shaft so as to rotate with it to indicate its rotative position throughout at least a part of one rotation, a second index dial positioned behind the first and rotatable about the operating shaft but not affixed to it, for indicating the rotative position of said operating shaft throughout a greater angle of rotation than the first, a cover plate covering both of said indicating dials, but having an opening therein through which a portion of said first dial may be observed, said first dial having a series of openings therein adapted to register with the opening in the cover to permit observation of appropriate portions of said second dial, and means for driving said second dial intermittently from said operating shaft.

6. A rotary multi-position electrical switch that comprises an operating shaft mounted for step-by-step rotation, and an indicator of the rotative position of the operating shaft that comprises two superimposed rotatable disks, the first of which is mounted fixedly upon the operating shaft so as to rotate with it and the second of which is mounted directly behind the first, upon the operating shaft, but in such a manner as to be freely rotatable with respect to the operating shaft, intermittent gearing between said second disk and the operating shaft so that the second disk will be rotated in step-by-step fashion, but only one step for a plurality of steps of operating shaft rotation, a series of indications of rotative position on the face of the second disk, these indications being arranged in at least two circular rows, a series of indications of rotative position on the face of the first disk, these indications being arranged in at least one circular row, a series of openings through said first disk, one in radial alignment with each indication of rotative position on that disk and said openings being arranged in at least two circular rows corresponding to the circular rows of indications of rotation on said second disk, and a cover for said disk having an opening exposing the indications of rotative position on said first disk, one at a time, and at the same time exposing the corresponding opening through said first disk and the indication of rotation on said second disk that is in position behind said opening.

References Cited in the file of this patent

UNITED STATES PATENTS

| 2,700,076 | Goode | Jan. 18, 1955 |

FOREIGN PATENTS

| 82,114 | Austria | Dec. 27, 1920 |
| 255,147 | Great Britain | July 14, 1926 |
| 259,620 | Great Britain | Oct. 12, 1926 |